(12) United States Patent
Eberling et al.

(10) Patent No.: US 6,264,291 B1
(45) Date of Patent: Jul. 24, 2001

(54) SPRING BRAKE ACTUATOR WITH INTEGRAL BIASED DOUBLE CHECK VALVE FOR ANTI-COMPOUNDING AND ROLL-BACK PROTECTION

(75) Inventors: Charles E. Eberling, Wellington; Andrew Marsh, Elyria; William P. Amato, Avon, all of OH (US)

(73) Assignee: AlliedSignal Truck Brake System, Co., Elyria, OH (US)

( * ) Notice: Subject to any disclaimer, the term of this patent is extended or adjusted under 35 U.S.C. 154(b) by 0 days.

(21) Appl. No.: 09/408,751

(22) Filed: Sep. 30, 1999

(51) Int. Cl.$^7$ ........................................ B60T 13/22
(52) U.S. Cl. ........................ 303/71; 188/170; 303/9.76; 303/7
(58) Field of Search ................ 303/71, 7, 9.76, 303/68, 84.1, 69, 89, 9, 72, 13–14, 28, 29, 40; 188/170, 265; 92/63, 64, 65, 130 A, 24; 137/102, 111, 112, 113, 843; 91/172, 178, 523

(56) References Cited

U.S. PATENT DOCUMENTS

| | | | |
|---|---|---|---|
| 3,285,672 | * 11/1966 | Avrea | 303/71 |
| 3,295,422 | * 1/1967 | Bostwick | 303/71 |
| 3,302,530 | * 2/1967 | Dobrikin et al. | 303/71 |
| 3,456,988 | * 7/1969 | Gibbons et al. | 303/71 |
| 3,581,627 | * 6/1971 | Campanini . | |
| 3,710,692 | * 1/1973 | Valentine . | |
| 3,800,668 | * 4/1974 | Valentine | 92/63 |
| 4,191,428 | * 3/1980 | Durling | 303/9.76 |
| 4,223,953 | * 9/1980 | Cruse | 303/71 |
| 4,973,107 | * 11/1990 | Graham | 303/9.76 |
| 5,118,165 | * 6/1992 | Latvala | 303/9.76 |
| 5,361,877 | * 11/1994 | Graham | 188/170 |
| 5,558,408 | * 9/1996 | Naedler et al. | 303/7 |
| 5,615,929 | * 4/1997 | Broome | 303/7 |
| 5,671,654 | * 9/1997 | Plantan | 92/63 |
| 6,079,312 | * 6/2000 | Plantan | 92/63 |

FOREIGN PATENT DOCUMENTS

2145485 * 3/1985 (GB) .

* cited by examiner

Primary Examiner—Douglas C. Butler

(57) ABSTRACT

A double check valve is integrally located in a spring brake chamber to reduce plumbing associated with a pneumatic brake system. Anti-compounding is provided by virtue of a bias pressure of approximately twenty to thirty psi between a pressure chamber of a service actuator and an operating chamber of a parking/emergency actuator. Likewise, vehicle roll-back is addressed since the transition from a service application to a park application assures that the service brakes are sufficiently applied until the spring brake becomes operative.

8 Claims, 2 Drawing Sheets

SPRING BRAKE ACTUATOR WITH INTEGRAL BIASED DOUBLE CHECK VALVE FOR ANTI-COMPOUNDING AND ROLL-BACK PROTECTION

BACKGROUND OF THE INVENTION

1. Field of the Invention

This invention pertains to a tandem spring and service brake actuator for a pneumatic braking system. More specifically, the invention is directed to integrating a biased double check valve into a tandem actuator.

2. Discussion of the Art

Conventional pneumatic braking systems for heavy duty vehicles such as trucks, buses, and the like use tandem brake actuators to effect actuation of the vehicle foundation brakes. The tandem brake actuators include a service brake actuator that is responsive to air pressure. The service brake actuator effects a service brake application by receiving a pneumatic signal, for example as provided by an operator depressing a foot pedal a preselected amount. The tandem brake actuator also includes a spring brake actuator to effect emergency and/or parking brake application. A heavy duty spring is associated with the spring actuator and urges an actuator rod in a brake application direction. Pneumatic pressure opposes the spring force during normal operation to release the emergency/parking brake so that service brake application can be effected as desired. The pneumatic pressure is vented, however, during emergency conditions or when the vehicle is parked so that the spring force can apply the emergency or parking brake.

As indicated above, both the service brake pressure and the hold off pressure of the spring actuator are controlled by pneumatic signals from the vehicle operator. Separate pneumatic lines effect control of the vehicle service and parking/emergency braking systems. It is contemplated further that electronic braking systems or electro-pneumatic braking systems form a part of the conventional pneumatic braking systems for heavy duty vehicles.

In present systems, a supply line extends from a dash valve and upon actuation supplies air pressure to effect emergency or parking brake application. A double check valve is associated with an anti-compounding circuit. The delivery from a service relay valve assures that the operator demand for pressure application, if no pressure is already present, is obtained from the relay valve for application to the spring brake. If the dash valve is actuated and the operator is unaware that supply pressure is already being delivered, i.e., the brakes are already actuated, the double check valve assures that the brake chamber receives the desired pneumatic signal. Compounding of brake forces is eliminated with the double check valve since supply pressure to the parking or emergency brake and the service pressure are not applied simultaneously through use of the double check valve. If the spring side of the tandem brake actuator is not pressurized and pressure is provided to the service side, a cumulative brake effect could occur—an undesired result.

Roll-back is associated with the transition from service braking to park/emergency braking. For example, if a truck is parked on an uphill incline, and the operator depresses the brake pedal, the truck is held in place. The operator then actuates the park brake, for example pulling a dash valve. As the operator lifts the foot from the brake pedal, there is a transition from where the service brake releases and the spring brake is actually applied. In this transition, there is the potential that the truck will roll backward until the spring brake is fully actuated. Consequently, brake system design must also address these issues and provide an anti-roll-back feature.

SUMMARY OF THE INVENTION

The present invention provides an improved braking apparatus for a pneumatic braking system that addresses the above noted problems and others.

According to a preferred embodiment of the invention, the braking apparatus includes a housing having a fixed wall separating an internal cavity in the service and parking/emergency actuators. A biased double check valve is integrally formed in the housing and communicates with the operating chambers of the service and parking/emergency actuators.

According to a more limited aspect of the invention, the check valve is biased to supply air pressure from the operating chamber of the service actuator to the operating chamber of the parking/emergency actuator at a predetermined level.

According to yet another aspect of the invention, the check valve is biased to preclude communication between the operating chambers of the actuators.

A primary advantage of the invention resides in the reduced plumbing associated with the integrated component.

Another advantage of the invention resides in optimizing system function as a result of locating the anti-compounding double check valve in the housing wall.

Still another advantage of the invention is provided by the reduced potential for vehicle roll-back during the transition from a service application to an emergency/park brake application.

A further advantage is associated with the higher parking forces in transition as a result of the partial compounding allowed by the biased valve.

Still other advantages and benefits will become apparent to those skilled in the art upon a reading and understanding of the following detailed description.

BRIEF DESCRIPTION OF THE DRAWINGS

The invention may take physical form in various parts and arrangements of parts, a preferred embodiment and method of which will be described in detail in the specification. A preferred arrangement of the invention is illustrated in the accompanying drawings. The drawings include.

DETAILED DESCRIPTION OF THE PREFERRED EMBODIMENT AND METHOD

Figure 1:
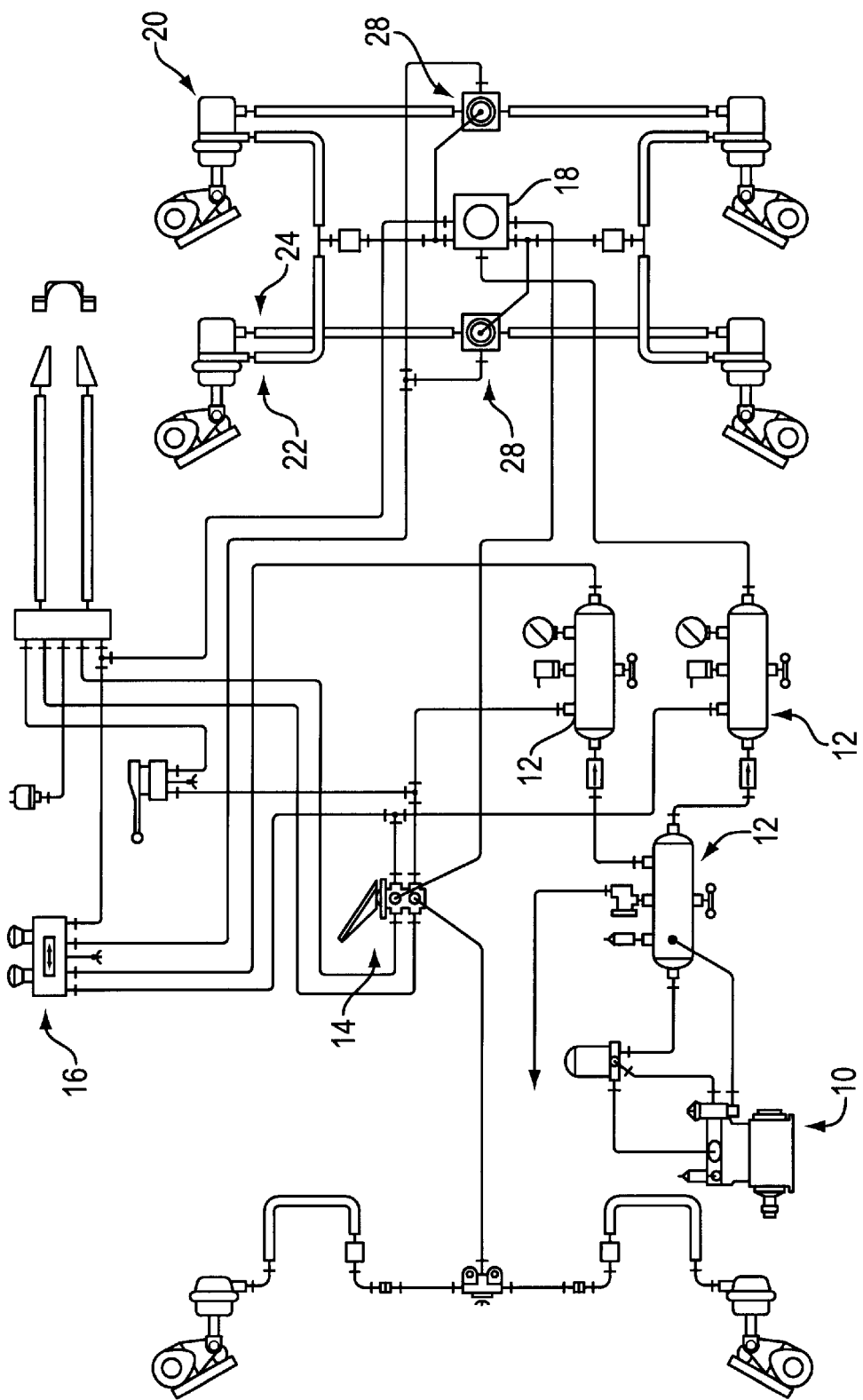
FIG. 1 is a schematic representation of an air brake system.

A known air brake system is illustrated in FIG. 1 which shows an air compressor 10 used to provide compressed air to one or more supply reservoirs 12. A foot operated brake valve 14 and a dash control valve 16 provide control signals to modulator control valves 18 that regulate air delivered to spring brake actuators 20. Four spring brake actuators associated with the rear braking are illustrated in FIG. 1. Each of the rear spring brake actuators includes a service port 22 that communicates with the modulator valve and a park control port 24 that communicates with quick release valves 28. As will be appreciated, the foot operated brake valve communicates with the modulator so that depressing a foot treadle provides a pneumatic control signal to deliver air pressure to the service port of the spring brake actuators, on the other hand, air provided to the ports 24 is employed to compress a spring associated with the brake chambers and thereby release the parking/emergency brake application. Further details of the braking system of FIG. 1 are well known to those skilled in the art and form no part of the present invention so that further discussion herein is deemed unnecessary.

Figure 2:
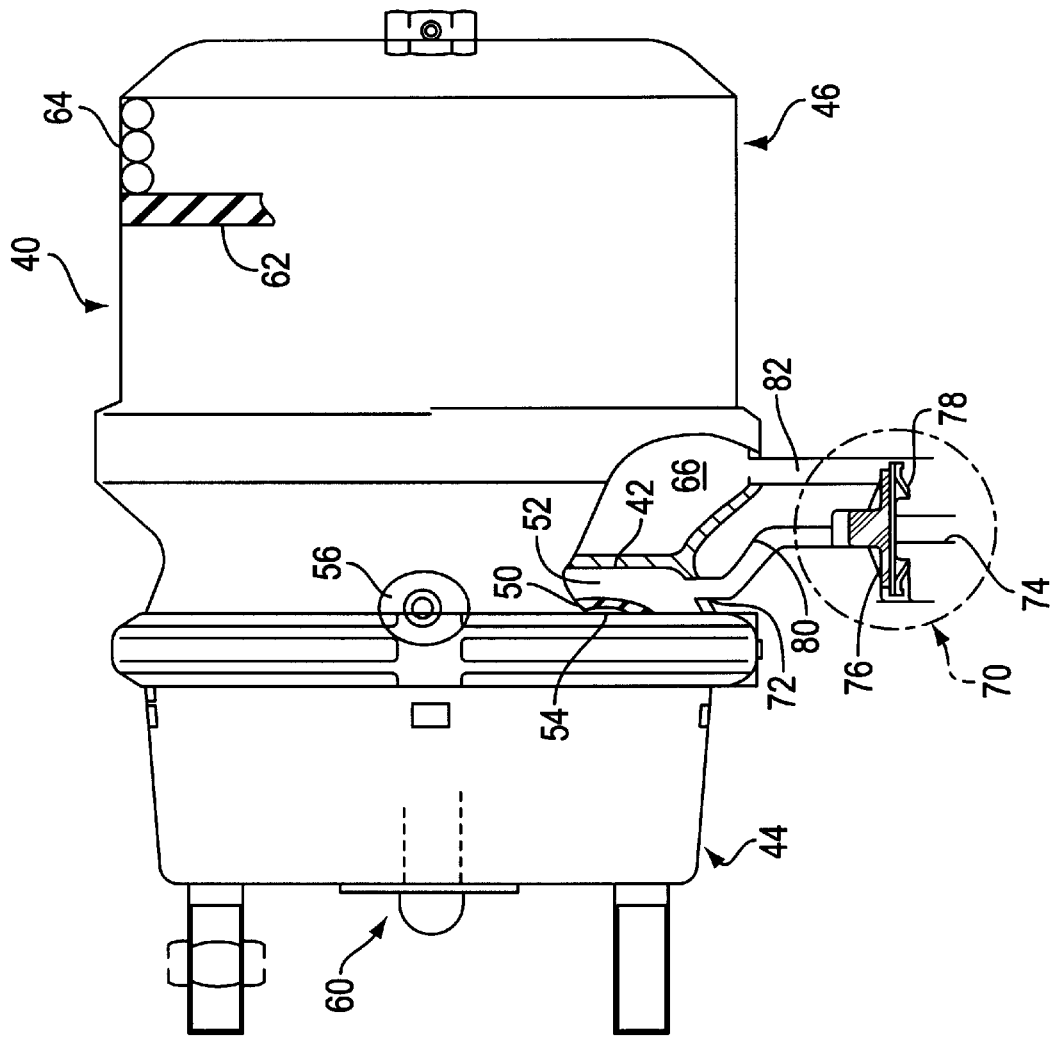
FIG. 2 is an elevational view of the brake chamber shown in partial cross-section.

With additional reference to the enlarged view of a spring brake actuator in FIG. 2, details of its structure and operation will become more apparent. The braking assembly includes a housing 40 that is separated by a rigid wall 42 into a service actuator 44 and a spring brake or park/emergency brake actuator 46. As is know from commonly-owned U.S. Pat. Nos. 4,472,001; 5,118,165; and 5,215,170, the details of which are hereby incorporated by reference, a movable wall or diaphragm 50 disposed in the service actuator separates the service actuator into a pressure side 52 of the service diaphragm and a non-pressure side 54 of the service diaphragm. Air pressure is provided through a service port 56 to selectively communicate air to the operating chamber 52. The air pressure urges a push rod member 60 to apply the brakes.

The push rod member also extends through the fixed wall 42. It is operatively associated or secured to a pressure responsive member such as a piston or diaphragm 62. The piston 62 defines a movable wall that is normally urged to actuate the push rod member 60, i.e., urged leftwardly as shown in FIG. 2. Thus, pressure is required in operating chamber 66 to urge the movable wall 60 to compress the spring 64.

In accordance with the present invention, a biased double check valve 70 is formed in wall 72 of the housing. Although any double check design could be used, an inverted T-shape or top hat configuration is illustrated. A park control port 74 selectively communicates with atmosphere. The T-shaped valve member 76 is biased by spring 78 to preclude communication between chamber 52 of the service actuator and operating chamber 66 of the park/emergency actuator. By way of illustration only, and to facilitate an understanding thereof, this communication is represented by passage 80 that connects to the chamber 52 and to the top of the T-shaped valve member. In addition, passage 82 communicates with a perimeter portion of the valve member and the operating chamber 66 of the park/emergency actuator. As represented by the enlarged encircled region of FIG. 2, the valve 70 is actually mounted in the side wall of the housing so that extended passage are eliminated and connections and fittings associated with such passages are also eliminated. When urged to the position shown by the spring 78, service pressure provided through port 56 to the chamber 52 is maintained approximately twenty to thirty psi above that of the operating chamber 66. This assures that when the spring actuator side is not pressurized, and pressure is then applied to the service side, the braking force is not compounded. In other words, if the spring were applied and additional service pressure were applied, a cumulative effect would be undesirably applied to the push rod. Accordingly, pressure is provided to the spring side to urge the spring to a release position when supply pressure is supplied to the service cavity. In other words, pressure is provided to the spring actuator pressure chamber but is reduced by the biasing force exerted by the biased double check valve. Thus, compounding is eliminated since supply pressure is also provided to the spring cavity so that both the service pressure and the spring force are not applied simultaneously.

With regard to roll-back, if the truck is parked on a steep grade, an operator will typically depress the foot pedal to apply the service brake pressure. Thereafter, a button or actuator (for example, on the dashboard) is actuated to apply the spring brake. As will be appreciated, this connects the operating chamber 66 with atmosphere so that the force of spring 64 can apply the park/emergency brake. As the operator releases the service braking, there is a transition from where the service brake releases and the spring brake is actually applied. By virtue of the twenty to thirty psi differential provided by the biased double check valve, the operator is assured that service brake pressure is held slightly above the pressure in cavity 66. This means that the service brake will provide a holding force until the spring force is sufficiently operative.

The invention has been described with reference to the preferred embodiment. Modifications and alterations will become apparent to those skilled in the art in so far as they fall within the scope of the appended claims or the equivalents thereof.

Having thus described the invention, it is now claimed:

1. A braking apparatus for a pneumatic braking system comprising:

a housing having a fixed wall separating an internal cavity into service and parking/emergency actuators;

the service actuator including a movable wall separating the actuator into pressure and non-pressure chambers, and a service port communicating with the pressure chamber to provide supply pressure thereto for controlling service braking;

the parking/emergency actuator including a movable wall normally urged toward a first, apply position by a spring disposed on one side of the wall and an operating chamber defined on the other side of the wall that selectively communicates with supply pressure and exhaust;

a rod member extending from the movable walls of the service and parking/emergency actuators for selectively applying and releasing associated brakes of the pneumatic braking system; and a double check valve integrally formed in the housing wall and communicating with the pressure chamber of the service actuator and the operating chamber of the parking/emergency actuator, said double check valve being normally biased to preclude communication between the pressure chamber of the service actuator and the operating chamber of the parking/emergency actuator, and to supply air pressure from the pressure chamber of the service actuator to the operating chamber of the parking/emergency actuator when pressure in the pressure chamber of the service actuator is sufficient to overcome said bias.

2. The braking apparatus of claim 1 wherein the check valve is biased to supply air pressure from the pressure chamber of the service actuator to the operating chamber of the parking/emergency actuator at a predetermined level.

3. The braking apparatus of claim 2 wherein the check valve is biased to preclude communication with the operating chamber of the parking/emergency actuator until the pressure chamber of the service actuator reaches approximately 30 psi.

4. The braking apparatus of claim 1 wherein the pressure chamber of the service actuator and the operating chamber of the parking/emergency actuator are separated by the fixed wall and further comprising a port formed in a side wall of the housing adjacent the fixed wall.

5. The braking apparatus of claim 1 further comprising a biasing member for urging the check valve to preclude communication between the pressure chamber of the service actuator and the operating chamber of the parking/emergency actuator.

6. A braking unit for a pneumatic braking system comprising:

a housing separated into service and parking/emergency actuators by a wall and having a push member extending therefrom for applying and releasing associated brakes, the housing having a service port communicating with a pressure chamber of the service actuator and a park control port communicating with an operating chamber of the parking/emergency actuator; and a check valve formed in a side wall of the housing in communication with both the pressure chamber and the operating chamber and selectively permitting communication therebetween, said check valve being normally biased to preclude communication between the pressure chamber of the service actuator and the operating chamber of the parking/emergency actuator, and to supply air pressure from the pressure chamber of the service actuator to the operating chamber of the parking/emergency actuator when pressure in the pressure chamber of the service actuator is sufficient to overcome said bias.

7. The braking unit of claim 6 wherein the check valve includes a biasing spring urging the check valve to preclude communication between the pressure chamber and the operating chamber.

8. The braking unit of claim 7 wherein the biasing spring precludes communication between the pressure chamber and the operating chamber until the pressure chamber of the service actuator is approximately 30 psi greater than the operating chamber of the parking/emergency actuator.

* * * * *